(12) United States Patent  
Muramatsu et al.

(10) Patent No.: US 11,139,711 B2  
(45) Date of Patent: Oct. 5, 2021

(54) ROTATING ELECTRICAL MACHINE (71) Applicant: MITSUBISHI POWER, LTD., Yokohama (JP)

(72) Inventors: Seijiro Muramatsu, Yokohama (JP); Daisuke Ito, Yokohama (JP); Miki Nishino, Yokohama (JP)

(73) Assignee: MITSUBISHI POWER, LTD., Yokohama (JP)

( * ) Notice: Subject to any disclaimer, the term of this patent is extended or adjusted under 35 U.S.C. 154(b) by 166 days.

(21) Appl. No.: 16/668,990

(22) Filed: Oct. 30, 2019

(65) Prior Publication Data

US 2020/0136458 A1 Apr. 30, 2020

(30) Foreign Application Priority Data

Oct. 31, 2018 (JP) .............................. JP2018-204907

(51) Int. Cl.
  *H02K 3/50* (2006.01)
  *H02K 3/12* (2006.01)
  *H02K 3/28* (2006.01)
  *H02K 3/38* (2006.01)

(52) U.S. Cl.
  CPC .............. *H02K 3/505* (2013.01); *H02K 3/12* (2013.01); *H02K 3/28* (2013.01); *H02K 3/38* (2013.01)

(58) Field of Classification Search
  CPC ............ H02K 3/505; H02K 3/12; H02K 3/28; H02K 3/38
  See application file for complete search history.

(56) References Cited

U.S. PATENT DOCUMENTS

| 2,428,781 | A | * | 10/1947 | Bowlus | .................. | H02K 19/22 |
| | | | | | | 310/268 |
| 2,742,583 | A | * | 4/1956 | Beckwith | ................. | H02K 9/00 |
| | | | | | | 310/57 |
| 2,828,428 | A | * | 3/1958 | Baudryrene | ............. | H02K 3/24 |
| | | | | | | 310/64 |
| 3,602,629 | A | * | 8/1971 | Friedrich | ............... | H01B 17/54 |
| | | | | | | 174/15.3 |

(Continued)

FOREIGN PATENT DOCUMENTS

| GB | 771770 A | 4/1957 |
| JP | 61-210852 A | 9/1986 |
| JP | 2003-199280 A | 7/2003 |

OTHER PUBLICATIONS

Extended European Search Report dated Mar. 2, 2020 for the European Patent Application No. 19205126.6.

*Primary Examiner* — Robert W Horn  
(74) *Attorney, Agent, or Firm* — Volpe Koenig (57) ABSTRACT

A rotating electrical machine of the present invention comprises a rotor; a stator disposed facing the rotor with a predetermined gap, and including a stator core and a stator coil; a high voltage bushing that outputs electricity from the stator coil to the outside; an electric power line including at least a connection ring extending in a circumferential direction, and connecting the high voltage bushing and one side of a coil end which is an axial-direction end of the stator coil to form an electrical path; and a dummy ring including a metal as a main material, and disposed in alignment with the connection ring in the circumferential direction and in a same circumference as the connection ring.

10 Claims, 12 Drawing Sheets

(56) References Cited

U.S. PATENT DOCUMENTS

| | | | | |
|---|---|---|---|---|
| 3,950,665 A | * | 4/1976 | Schneider | H02K 3/22 |
| | | | | 310/260 |
| 4,199,700 A | | 4/1980 | Daugherty et al. | |
| 4,488,072 A | * | 12/1984 | Archibald | H02K 5/225 |
| | | | | 310/71 |
| 4,642,498 A | * | 2/1987 | Archibald | H01F 38/38 |
| | | | | 310/176 |
| 5,548,174 A | * | 8/1996 | Siga | C22C 38/44 |
| | | | | 310/216.121 |
| 7,827,700 B2 | * | 11/2010 | Koinuma | H02K 15/0093 |
| | | | | 33/503 |
| 8,222,778 B2 | * | 7/2012 | Kabata | H02K 3/22 |
| | | | | 310/71 |
| 8,853,903 B2 | * | 10/2014 | Mori | C22C 38/42 |
| | | | | 310/75 R |
| 10,658,904 B2 | * | 5/2020 | Muramatsu | H02K 7/1823 |
| 2013/0192025 A1 | * | 8/2013 | Taniyama | H02K 9/00 |
| | | | | 16/2.2 |
| 2016/0006312 A1 | * | 1/2016 | Kowalski | H02K 11/20 |
| | | | | 310/71 |
| 2020/0136458 A1 | * | 4/2020 | Muramatsu | H02K 3/28 |

* cited by examiner

ROTATING ELECTRICAL MACHINE

CLAIM OF PRIORITY

The present application claims priority from Japanese Patent Application JP 2018-204907 filed on Oct. 31, 2018, the content of which is hereby incorporated by reference into this application.

BACKGROUND OF THE INVENTION

The present invention relates to a rotating electrical machine, and more particularly, to a rotating electrical machine including a connection ring (connection line) to electrically connect a stator coil.

Generally, in a stator of a large rotating electrical machine such as a generator for thermal power generation, a stator coil is embedded in plural slots (grooves) of a stator core and fixed with a wedge. The stator coils embedded in the respective slots form a coil by being electrically connected with each other outside the slots at an end in an axial direction. Outside the slots, a coil end is fixed with a coil end support that is formed with a glass-laminated sheet, a nonmagnetic metal, glass fiber, epoxy varnish or other materials.

In a three-phase synchronous generator, the number of parallel circuits of the stator is generally one, two, three, or four. In any wire connection, a connection ring (connection line) to electrically connect coils in distant slots with each other is provided on one or both sides of the coil end. The connection ring generally has a ring shape and it is fixed to the outer diameter side of the coil end support.

Further, the stator coil has a lead from the connection ring to the outside and a connection line connected to a high voltage bushing, and sends generated electricity to the system with the lead and the connection line.

At a coil end without the above-described connection ring and the lead to the outside (i.e. coil end on the opposite side to the coil end with the connection ring and the lead), the coil end support is symmetrically provided in a circumferential direction. On the other hand, in many cases, at the coil end with the connection ring and the lead to the outside, the coil end support is nonuniform in the circumferential direction due to physical limitations of the connection ring and the lead to the outside (i.e. there is a part where the connection ring and the lead are not provided in the circumferential direction). Further, in many cases, the number of the connection rings differs depending on the position in the circumferential direction.

Document JP 2003-199280 discloses an example of the conventional techniques. JP 2003-199280 discloses a structure where, at an end of a stator coil, two arc-shaped phase rings which connect a connection conductor connected to a winding conductor with a lead conductor are disposed along a circumferential direction, and connection ends of the two phase rings to the connection conductor are faced each other in the circumferential direction, and further, an interval block is inserted between the faced connection ends to fix the faced parts.

The stator coil end of the rotating electrical machine vibrates with electromagnetic vibration. As the capacity of the rotating electrical machine becomes larger and the flowing current increases, the electromagnetic force as an excitation source becomes larger and the electromagnetic vibration also becomes larger. Particularly, when the coil end support is asymmetric at the coil end with the connection ring and the lead to the outside, it is difficult to suppress the electromagnetic vibration at the coil end. When the vibration is large at the coil end, frictional wear debris occurs at the coil end and among the coil end support constituent parts. Further, insulation of the stator coil may be damaged.

Accordingly, it is desired that the coil end support has a firmer structure to suppress the vibration of the coil end. However, at the coil end with the connection ring and the lead to the outside, structure change of the coil end support is limited and not flexible. Further, the number of the connection rings is often nonuniform in the circumferential direction. Therefore, it is difficult to reduce the vibration of the coil end only by changing structure and measurements of the coil end support. Above-mentioned document JP 2003-199280 does not refer to any solution to the above-described problems.

SUMMARY OF THE INVENTION

The present invention has been made in view of the above-described problems. The object of the present invention is to provide a rotating electrical machine in which the rigidity of the coil end with the connection ring is enhanced, and the rigidity can be uniformed in the circumferential direction, and further, the natural frequency of the coil end is lowered to reduce the vibration of the coil end.

To attain the above object, a rotating electrical machine of the present invention comprises a rotor; a stator disposed facing the rotor with a predetermined gap, and including a stator core and a stator coil; a high voltage bushing that outputs electricity from the stator coil to the outside; an electric power line including at least a connection ring extending in a circumferential direction, and connecting the high voltage bushing and one side of a coil end which is an axial-direction end of the stator coil to form an electrical path; and a dummy ring including a metal as a main material, and disposed in alignment with the connection ring in the circumferential direction and in a same circumference as the connection ring.

According to a rotating electrical machine of the present invention, it is possible to enhance the rigidity of the coil end with the connection ring and to uniformize the rigidity in the circumferential direction, and it is possible to lower the natural frequency of the coil end to reduce the vibration of the coil end.

DETAILED DESCRIPTION OF EMBODIMENTS

Rotating electrical machines according to embodiments of the present invention will be described below with reference to the drawings in comparison to a traditional rotating electrical machine. Note that the same constituent elements will have the same reference numerals in the respective figures and detailed explanations of elements that are already explained will be omitted.

First, a configuration of a rotating electrical machine of the present invention will be described using FIG. 1.

Figure 1:
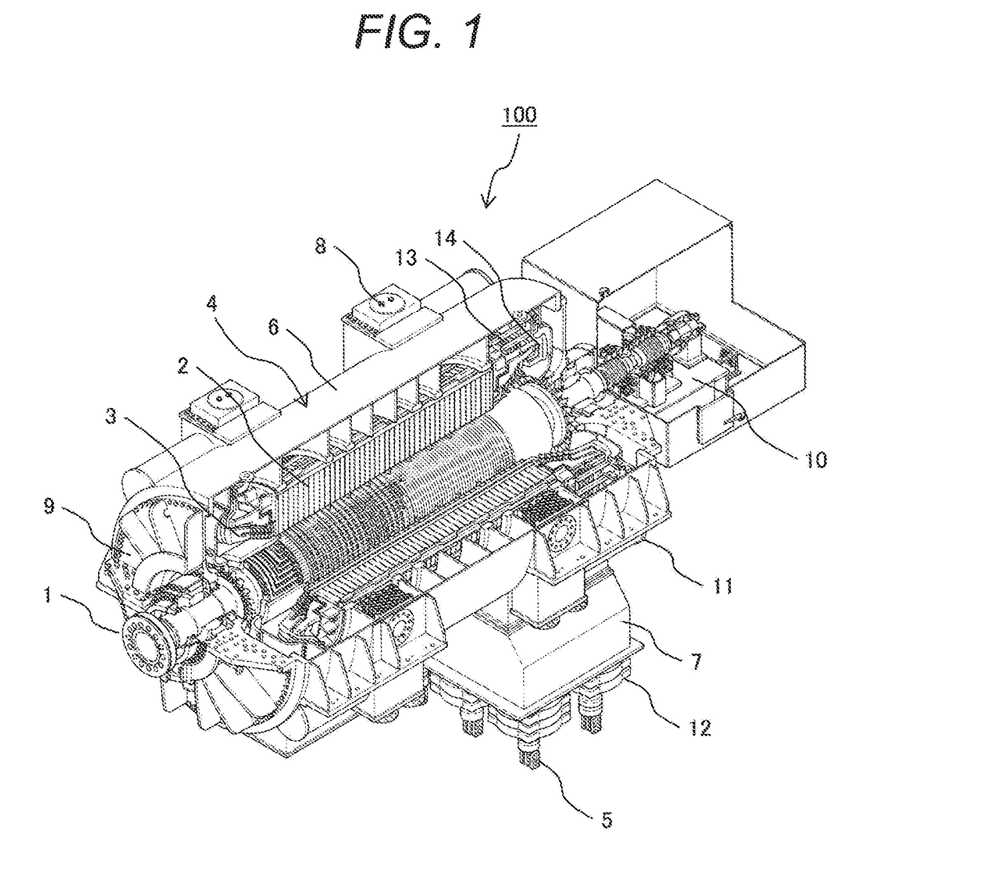
FIG. 1 is a partially-broken perspective view showing an entire configuration of a rotating electrical machine of the present invention.

With reference to FIG. 1, a rotating electrical machine (generator) 100 which is cooled with hydrogen gas is generally classified to three types of rotating electrical machines: a water-cooled rotating electrical machine in which a stator coil 3 is water-cooled according to output (capacity) and the inside of the rotating electrical machine is cooled with hydrogen gas, a hydrogen-cooled rotating electrical machine in which the inside of the rotating electrical machine is cooled with hydrogen gas, and an air-cooled rotating electrical machine in which the inside of the rotating electrical machine is cooled with air. Among these machines, the water-cooled rotating electrical machine and the hydrogen-cooled rotating electrical machine is filled with pressurized hydrogen gas on the inside. FIG. 1 shows a rotating electrical machine 100 internally filled with hydrogen gas.

The rotating electrical machine 100 in FIG. 1 schematically includes a rotor 1, a stator 4, a high voltage bushing 5, electric power lines, an outer casing 6, a terminal box 7, a hydrogen cooler 8, an end bracket 9, a brush gear 10, a foot 11, and a current transformer 12. A stator 4 faces the rotor 1 with a predetermined gap and includes a stator core 2, a stator coil 3, and an outer casing 6. A high voltage bushing 5 outputs electricity from the stator coil 3 to the outside of the rotating electrical machine 100. Electric power lines includes a connection ring 13, a lead 14 to stator bar, and a lead 15 between the connection ring 13 to the bushing 5, which connect the stator coil 3 to the high voltage bushing 5 to form an electrical path as is described later. An outer casing 6 accommodates at least the rotor 1, the stator 4, and a connection between the stator coil 3 and the connection ring 13 of the electric power lines, and is filled with the hydrogen gas on the inside. A terminal box 7 communicates with the outer casing 6 and is attached to a lower part of the outer casing 6. A hydrogen cooler 8 cools the inside of the rotating electrical machine 100 with the hydrogen gas. An end bracket 9 covers the axial-direction end of the outer casing 6. A foot 11 fixes the rotating electrical machine 100. A current transformer 12 measures an output current from the high voltage bushing 5 to the outside of the rotating electrical machine 100.

For example, in a turbine generator for thermal power generation, power is generated by transmitting rotational energy of a steam turbine or a gas turbine to the rotor 1 and turning the rotor 1 at a high speed on the inner side of the stator coil (stator winding) 3.

The stator 4 in the hydrogen-cooled turbine generator includes the stator core 2 formed by laminating a silicon-steel sheet in the axial direction, and the stator coil 3 attached to the stator core 2. The stator further includes the connection ring 13 and the lead 14 to connect the stator coil 3 and a power-supply terminal shown in FIG. 2, and the lead 15 to output electricity generated in the machine to the outside.

Figure 2:
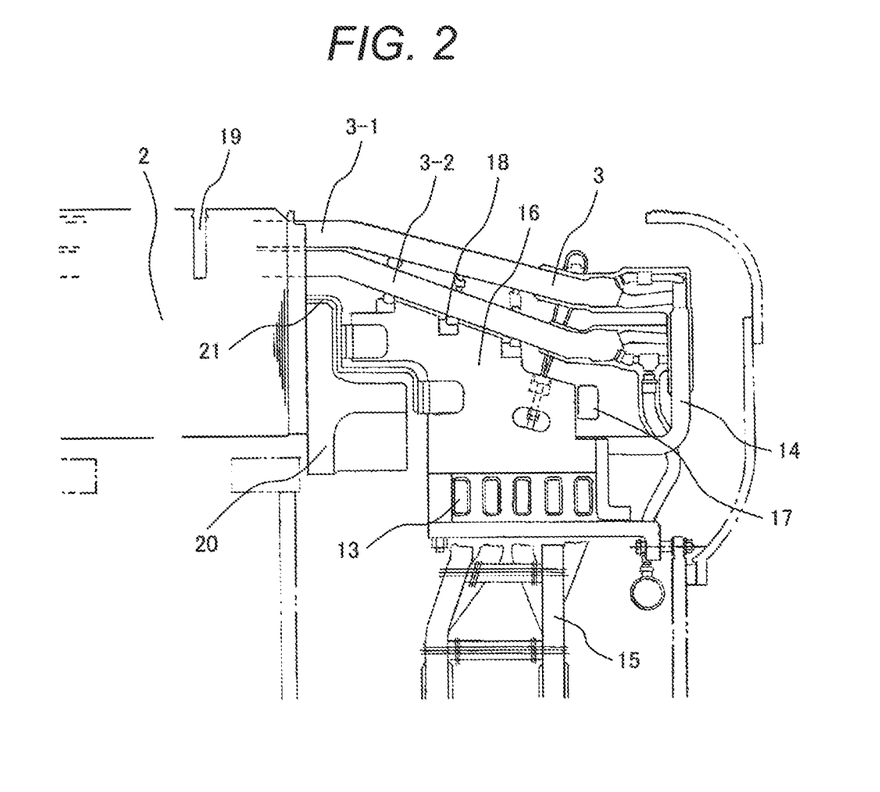
FIG. 2 is a cross-sectional view showing the structure of an end of a traditional rotating electrical machine viewed from a lateral direction.

With reference to FIG. 2, an example of the structures of the coil end support and the connection ring 13 in the traditional turbine generator (rotating electrical machine) will be described. FIG. 2 is a cross-sectional view showing the structure of the end of the traditional rotating electrical machine viewed from a lateral direction.

As shown in FIG. 2, the stator coil 3 includes a top bar 3-1 and a bottom bar 3-2. The top bar 3-1 and the bottom bar 3-2 are connected to each other at the axial-direction end (coil end) of the stator coil 3. The straight line part of the stator coil 3 is placed in the stator slot 19 provided on the inner diameter side of the stator core 2 in the order of the bottom bar 3-2 and the top bar 3-1, and pressed with the wedge on the inner diameter side of the stator slot 19.

The stator coil 3 has a curved shape at the coil end on the axial-direction outside of the stator core 2. The coil end is tied by roving of glass fiber to a permanent ring 17 and a support ring 18 integrated with an axial support 16 fixed to the stator core 2, and hardened with epoxy resin. The coil end support includes the axial support 16, the permanent ring 17, and the support ring 18. The coil end support is fixed to a stator core clamp 20 provided at the end of the stator core 2.

The stator coil 3 is provided with the connection ring 13 provided on the outer diameter side of the axial support 16 in the circumferential direction and the lead 14 to connect the connection ring 13 to the stator coil 3 for outputting the generated electricity to the outside. The connection ring 13 and the lead 14 are electrically connected to the coils and the lead 15 for connecting the coils and the outside.

Figure 3:
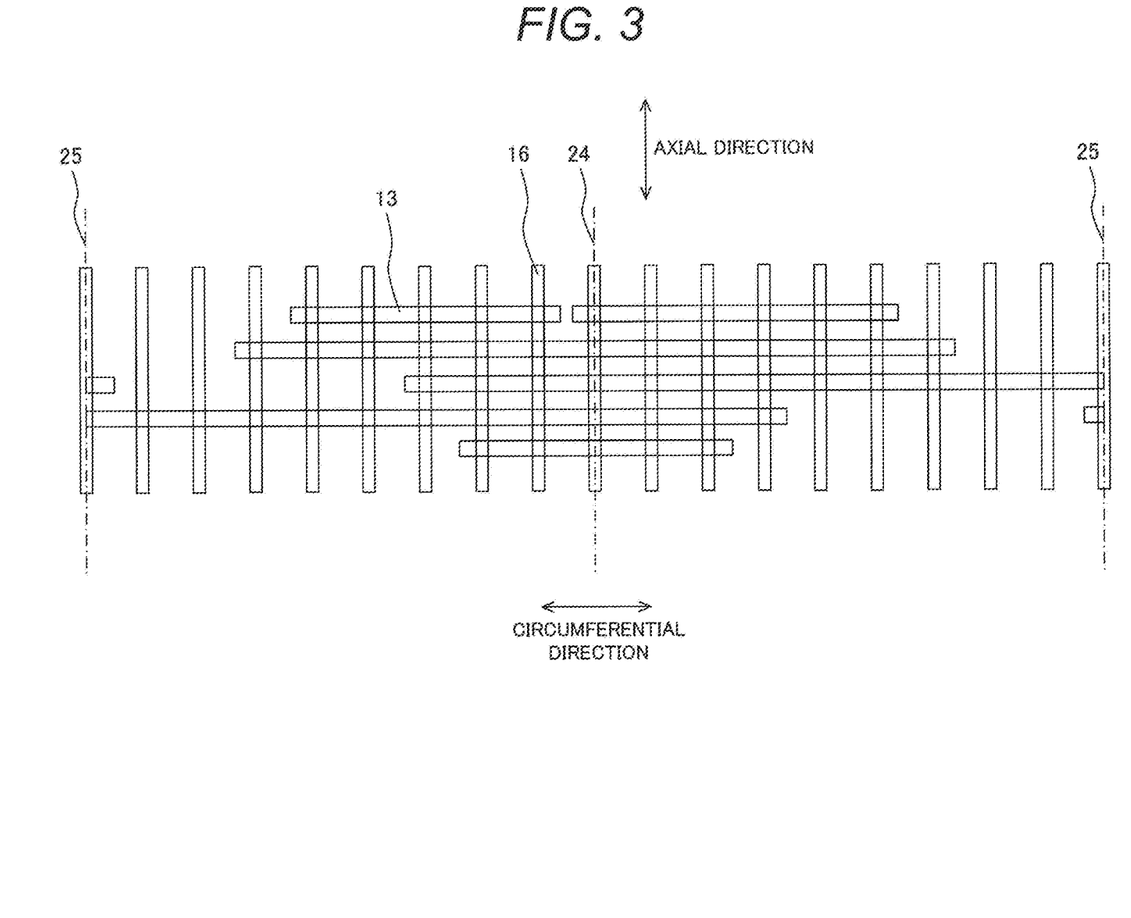
FIG. 3 is a developed view showing a connection ring of the traditional rotating electrical machine.
Figure 4:
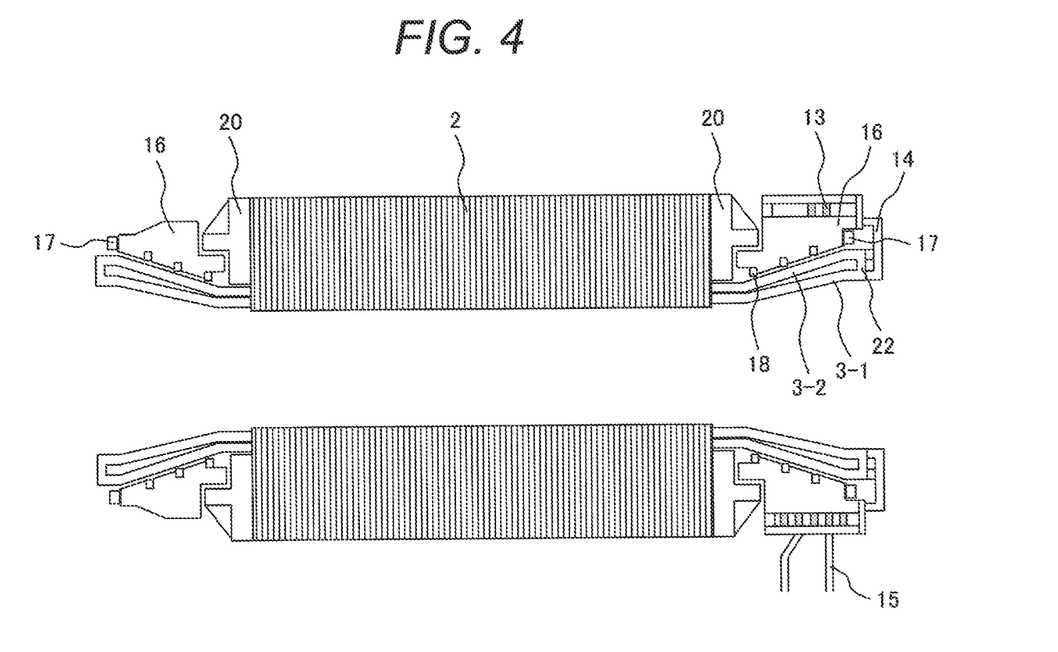
FIG. 4 is a diagram of the stator of the traditional rotating electrical machine viewed from the lateral direction.

FIG. 3 is a developed view of the connection ring 13 in the traditional rotating electrical machine. FIG. 4 is a diagram of the traditional stator 4 viewed from the lateral direction.

As it is understood from FIGS. 3 and 4, in the traditional structure, the number of connection rings 13 is not uniform in the entire circumference. The number of the connection rings 13 is five in a lower part 24 (the lower part in FIG. 4 where five connection rings 13 are provided) in which the lead 15 is provided. On the other hand, the number of the connection rings 13 is two in an upper part 25 (the upper part in FIG. 4 where two connection rings 13 are provided).

First Embodiment

With reference to FIGS. 5 to 8, the structure of the connection ring 13 of a rotating electrical machine according to a first embodiment of the present invention will be described compared to the structure of the traditional connection ring 13 shown in FIGS. 2 to 4.

Figure 5:
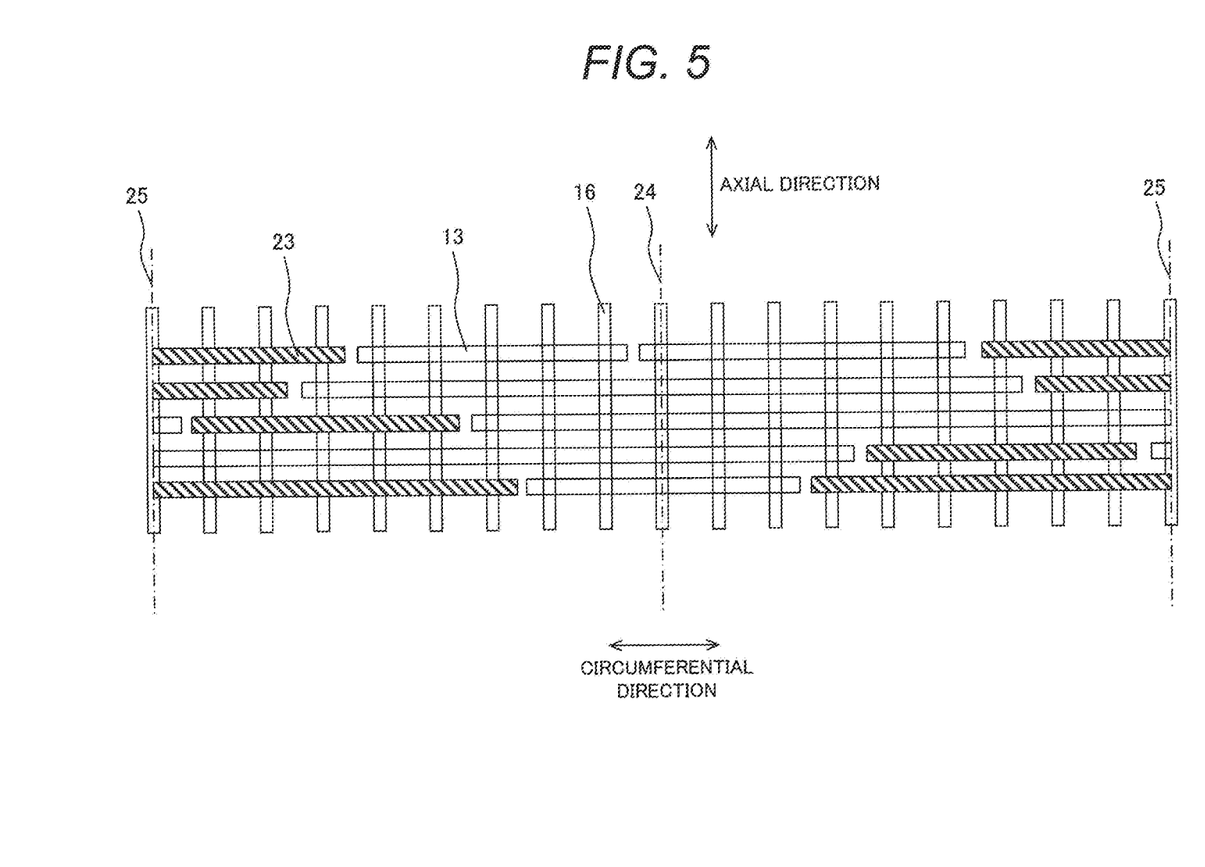
FIG. 5 is a developed view showing the connection ring and a dummy ring in the rotating electrical machine according to a first embodiment of the present invention.
Figure 6:
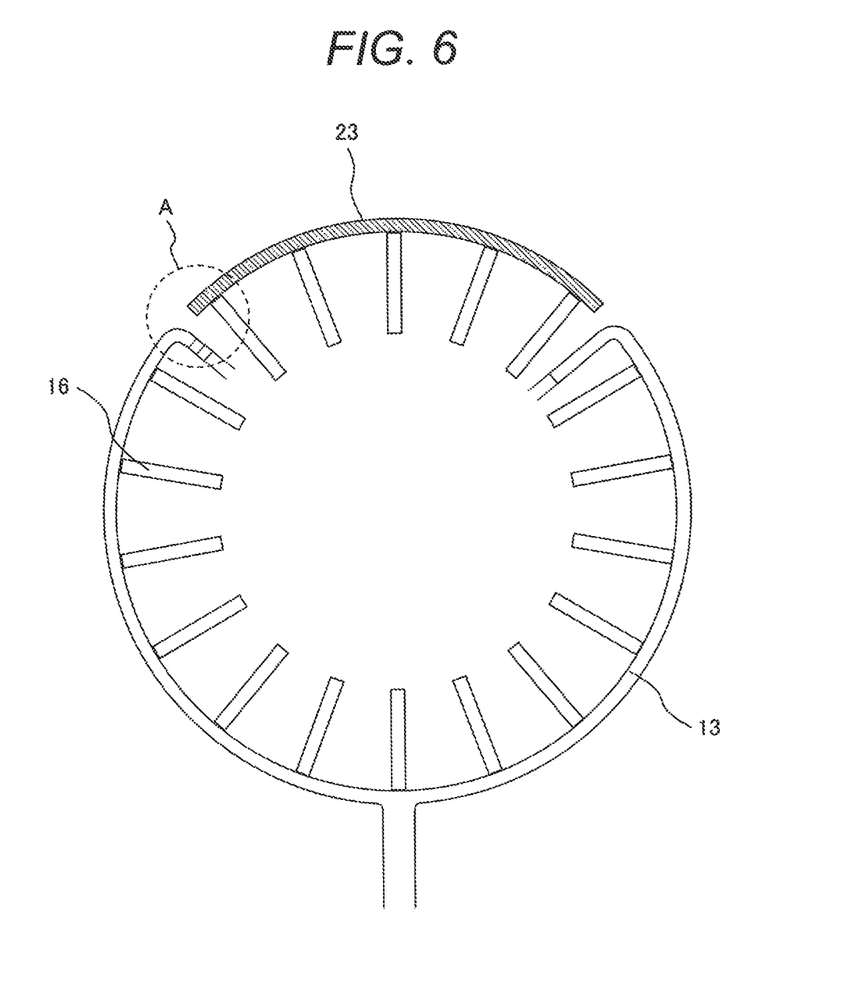
FIG. 6 is a diagram viewed from the axial direction, showing the connection ring and the dummy ring in the rotating electrical machine according to the first embodiment of the present invention.
Figure 7:
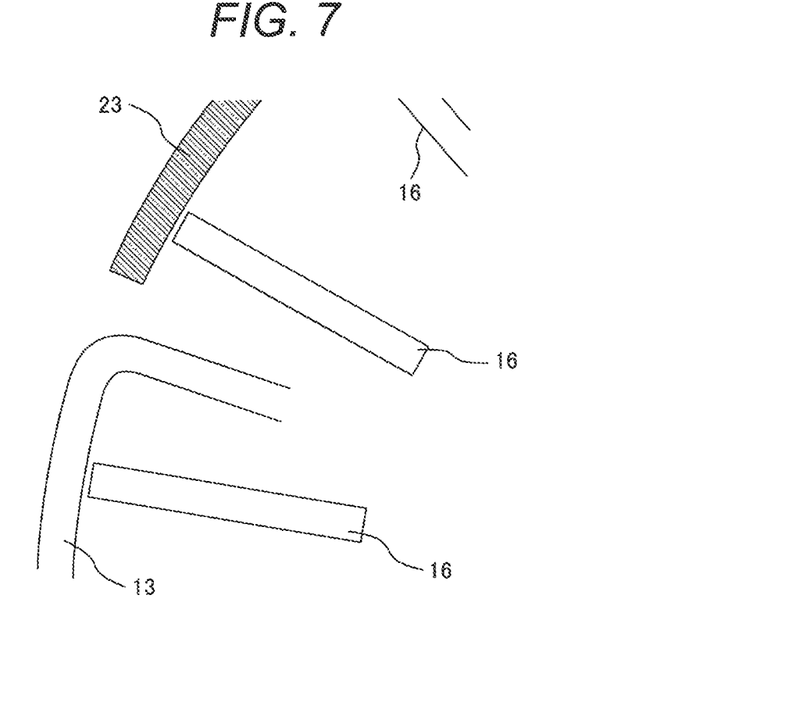
FIG. 7 is an enlarged view of a part A in FIG. 6 showing the connection ring and the dummy ring in the rotating electrical machine according to the first embodiment of the present invention.
Figure 8:
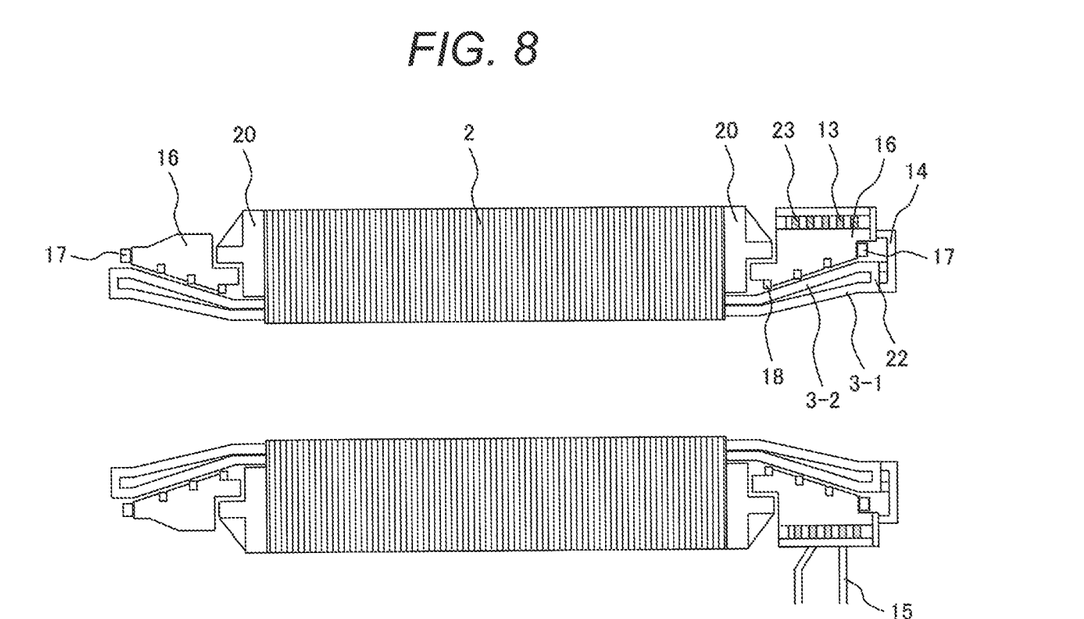
FIG. 8 is a diagram of the stator of the rotating electrical machine according to the first embodiment of the present invention viewed from the lateral direction.

FIG. 5 shows arrangement of a dummy ring 23 in addition to the connection ring 13 in FIG. 3. FIG. 6 is a connection diagram of the dummy ring 23 viewed from the axial direction. FIG. 7 is an enlarged view of the connection between the connection ring 13 and the dummy ring 23 in FIG. 6. FIG. 8 shows arrangement of the dummy ring 23 in addition to the connection ring 13 in FIG. 4.

As shown in these figures (especially FIGS. 6 and 7), in the present embodiment, the dummy ring 23 formed with a metal as a main material is disposed in alignment with the connection ring 13 in the circumferential direction so that the dummy ring 23 is disposed in the same circumference as the connection ring 13. More particularly, the connection ring 13 and the dummy ring 23 which correspond to each other are provided in the same positions in the axial and radial directions and arrayed in the circumferential direction. The connection ring 13 and the dummy ring 23 are supported with plural axial supports 16 radially fixed to the axial-direction end (coil end) of the stator core 2 at a predetermined interval in the circumferential direction.

The dummy ring 23 in the present embodiment is configured to have same measurements, density, and rigidity as those of the connection ring 13, and not to pass an electric current through the dummy ring 23. More particularly, for example, the dummy ring 23 is formed with one of a Cu-based member, a SUS-based member, and a combination member of a Cu-based or SUS-based material and FRP (Fiber-glass Reinforced Plastic). The dummy ring 23 is subjected to insulation treatment for not passing an electric current.

In the structure of the present embodiment (FIGS. 5 to 8), compared to the traditional structure (FIGS. 2 to 4), the dummy ring 23 which does not pass electricity but has mechanical rigidity close to that of the connection ring 13 is provided in an upper part where the number of connection rings 13 is small such that the structure is mechanically equivalent to a structure in which five connection rings 13 are provided over the entire circumference.

As a comparative example, a case will be considered where the material of the dummy ring is a comparatively light with respect to metals, such as a glass-laminated sheet.

To uniformly reduce the vibration of the coil end and the connection ring 13, it is necessary to consider the natural frequency of the coil end in addition to enhancement of the rigidity of the connection ring 13 including the dummy ring 23.

The coil end is excited with a magnetic force with frequency twice as the rotating frequency (excited with a 100 Hz magnetic force for 50 Hz machine, and excited with a 120 Hz magnetic force for 60 Hz machine). Generally, the natural frequency of the coil end is lower than the frequency twice as the rotating frequency by several Hz to several tens Hz. Therefore, the effect with the dummy ring of a glass-laminated sheet is limited.

On the other hand, as in the present embodiment, when the dummy ring 23 is formed with a metal (one of a Cu-based member, a SUS-based member, and a combination member of a Cu-based or SUS-based material and FRP) having a density same as or close to that of the connection ring 13 and the dummy ring 23 has same rigidity and mass as those of the connection ring 13, the entire connection ring 13 is heavy. Accordingly, the natural frequency of the coil end is lowered, away from the frequency twice as the rotating frequency.

Therefore, use of the dummy ring 23 mainly including a metal has an advantage that the rigidity of the coil end is increased and uniform in the circumferential direction, and also has an advantage that the natural frequency of the coil end is lowered, away from the frequency twice as the rotating frequency, bringing an effect of further reducing vibration.

Accordingly, according to the present embodiment, the rigidity of the coil end with the connection ring 13 is enhanced. In addition, it is possible to uniform the rigidity in the circumferential direction, and the natural frequency of the coil end is lowered. Thus, an effect of reducing vibration is achieved.

Figure 15:
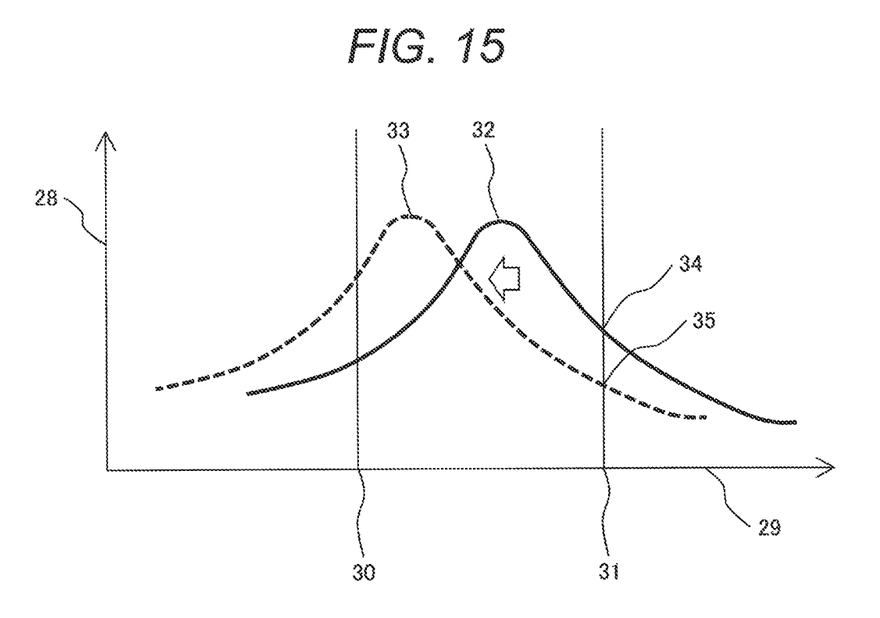
FIG. 15 is a characteristic diagram showing a relationship between natural frequency and vibration amplitude of the coil end with a comparison of the amplitudes between the traditional coil end and the coil end of the present invention.

FIG. 15 shows a relationship between the natural frequency and the vibration amplitude of the coil end with a comparison of the amplitudes between the traditional coil end and the coil end of the present embodiment. In FIG. 15, a vertical axis 28 indicates the vibration amplitude, and a horizontal axis 29 indicates the frequency.

As shown in FIG. 15, a natural frequency 33 of the coil end in the present embodiment is lowered in frequency since the dummy ring 23 is provided and the coil end becomes heavy, lower than a natural frequency 32 of the coil end in a traditional structure. The coil end is excited at a frequency 31 twice as the rotating frequency 30. Therefore, a vibration amplitude 34 of the coil end in the traditional structure is lowered by providing the dummy ring 23 to a vibration amplitude 35 of the coil end with the dummy ring 23 in the present embodiment. Thus, the natural frequency of the coil end is lowered and a vibration reduction effect is achieved.

Second Embodiment

Figure 9:
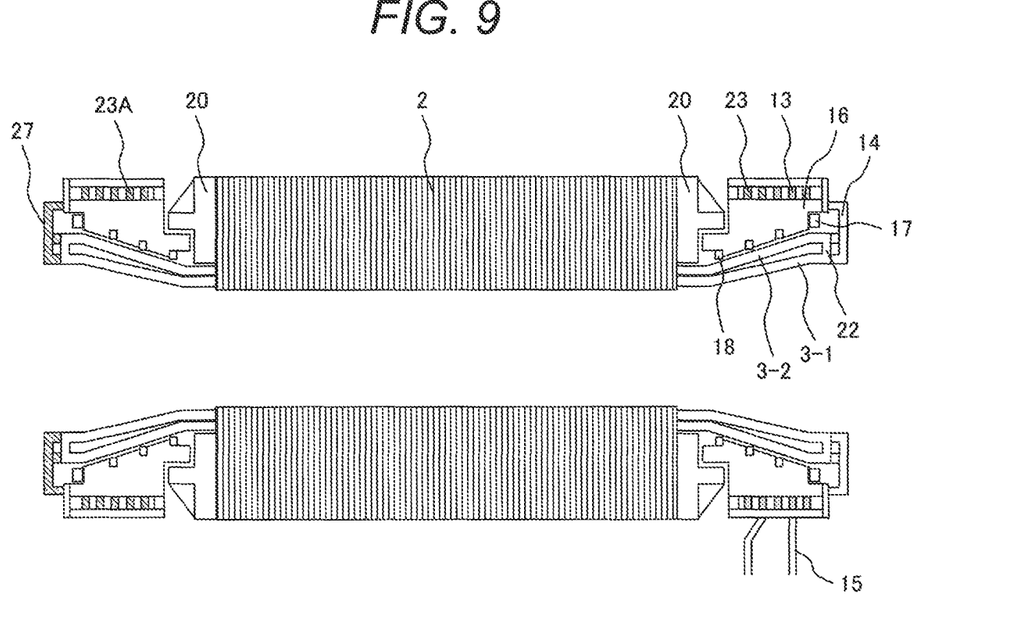
FIG. 9 is a diagram of the stator of the rotating electrical machine according to a second embodiment of the present invention viewed from the lateral direction.

FIG. 9 shows a rotating electrical machine according to the second embodiment of the present invention.

The rotating electrical machine of the present embodiment shown in FIG. 9 includes a second dummy ring 23A over the entire circumference in the circumferential direction on the coil end side where the connection ring 13 is not provided.

The second dummy ring 23A is supported with plural axial supports 16, radially fixed to the axial-direction end of the stator core 2 on the coil end side where the connection ring 13 is not provided at a predetermined interval in the circumferential direction. The second dummy ring 23A is connected to the coil end via a dummy lead 27.

As shown in FIGS. 1 and 4, the connection ring 13 is generally provided only on the high voltage bushing 5 side or the lead 14 side in a two-pole generator for thermal power generation.

In the present embodiment shown in FIG. 9, the second dummy ring 23A is provided as a ring having uniform rigidity in the entire circumference. The second dummy ring 23A and the dummy lead 27 to connect the second dummy ring 23A and the coil end are provided over the entire circumference even on the side where the high voltage bushing 5 or the lead 14 is not provided. According to this configuration, the mechanical rigidity of the coil end is equivalent to that on the high voltage bushing 5 or a lead 14 side.

With this configuration of the present embodiment, similar advantages are obtained to those in the first embodiment. Further, in the structure where the connection ring 13 is not connected to the coil end, the vibration reduction effect equivalent to that obtained in the structure where the connection ring 13 is connected is achieved by newly providing the second dummy ring 23A over the entire circumference so that the rigidity and the mass are equal to those in the structure where the connection ring 13 is connected.

When the second dummy ring 23A is provided on the entire circumference on the side where the connection ring 13 is not provided, a further vibration reduction effect is attained by mechanically joining the second dummy ring 23A and the coil end with the dummy lead 27.

Third Embodiment

Figure 10:
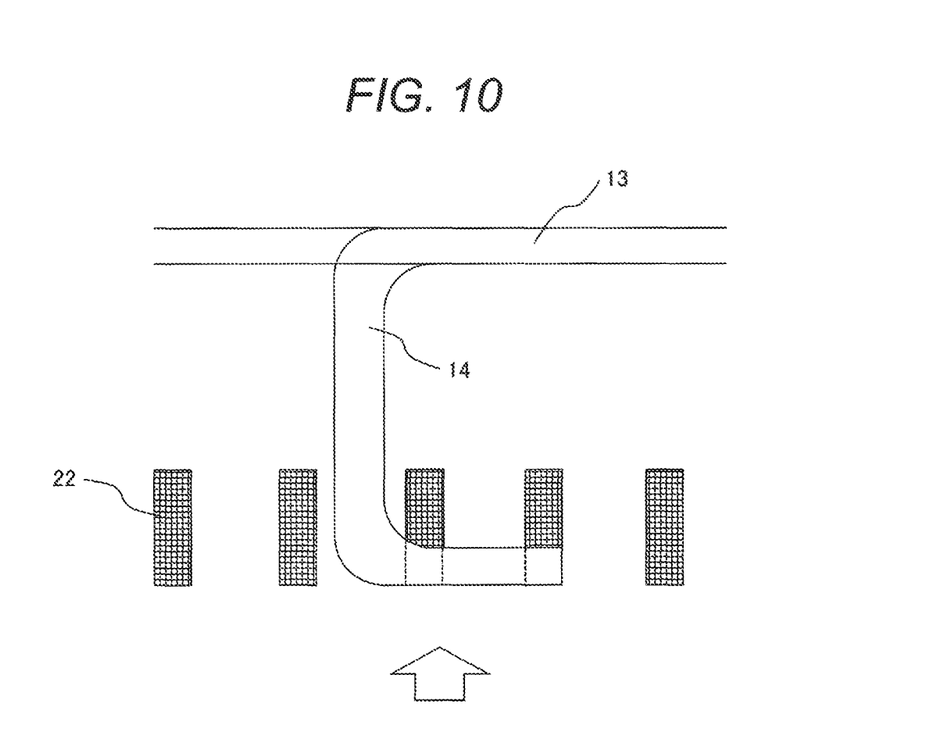
FIG. 10 is a diagram of the traditional lead viewed from an axial direction.
Figure 11:
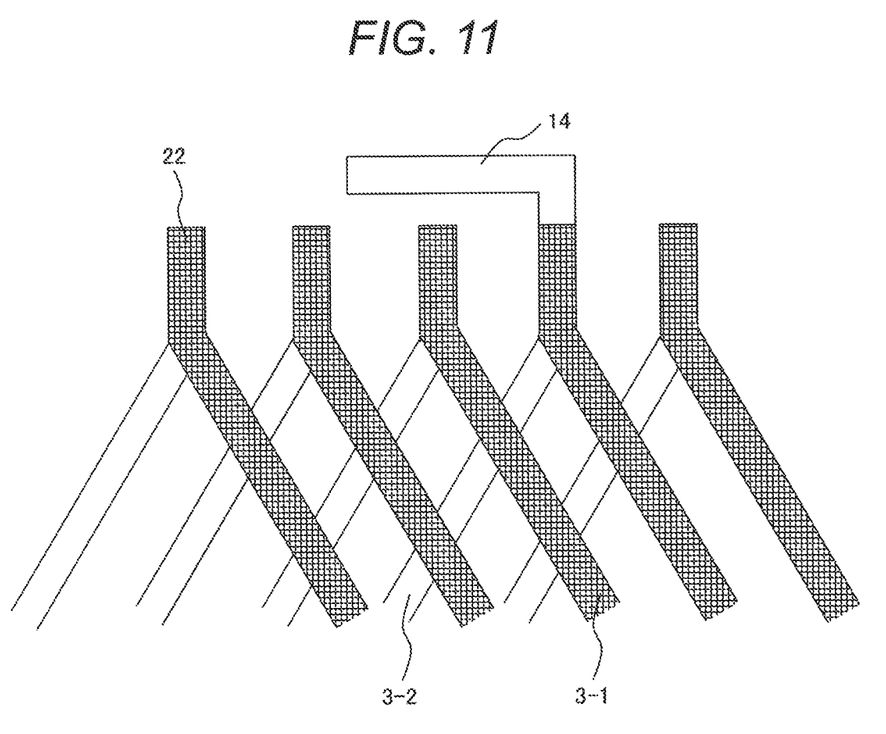
FIG. 11 is a diagram of the traditional lead viewed from an inner diameter side.
Figure 12:
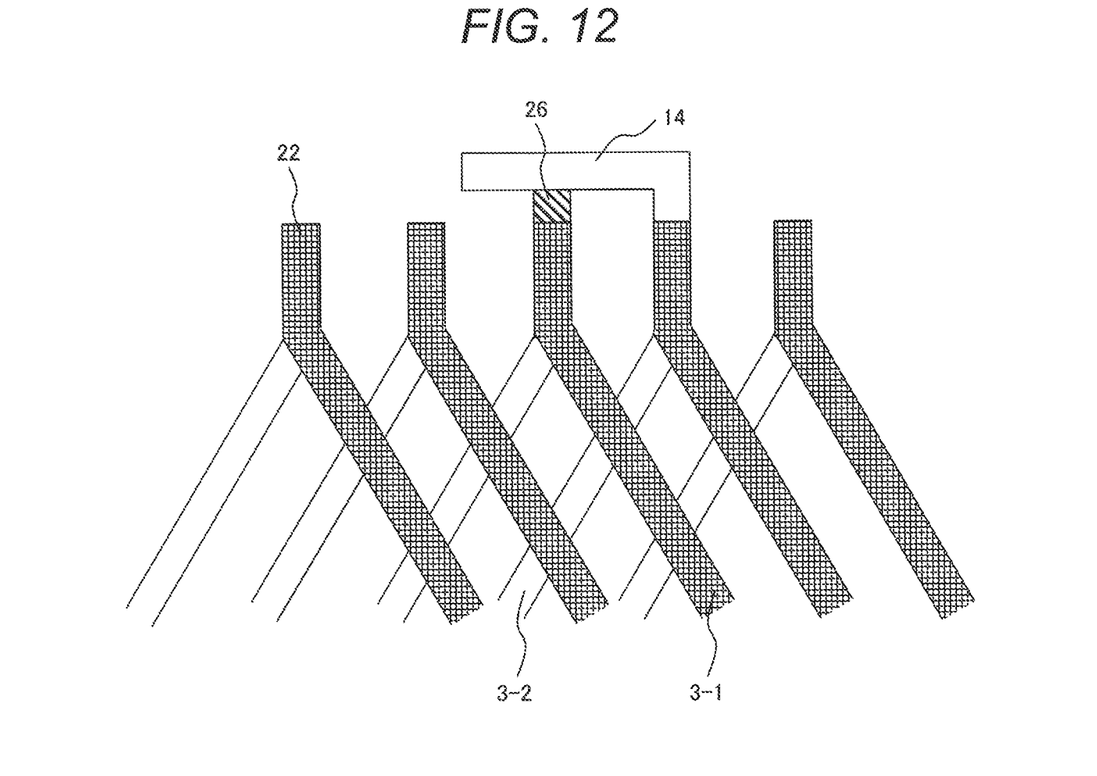
FIG. 12 is a diagram showing the lead viewed from the inner diameter side in the rotating electrical machine according to a third embodiment of the present invention.

With reference to FIGS. 10 to 12, a rotating electrical machine according to the third embodiment of the present invention will be described.

FIG. 10 shows the lead 14 in the traditional rotating electrical machine viewed from the axial direction. FIG. 11 shows the lead 14 in the traditional rotating electrical machine viewed from the inner diameter side. These figures show the lead 14 is connected to the coil end. The lead 14 is connected to the connection ring 13 and the coil end positioned on the inner diameter side.

FIG. 12 shows a configuration of the third embodiment in which the lead 14 is connected via a spacer 26 to a coil end other than the coil end which is electrically connected (i.e. the lead 14 is connected to a coil end which is not electrically connected) to enhance the mechanical connection between the lead 14 and the coil end, in comparison to the traditional structure in FIG. 11. To enhance the connection between the lead 14 and the coil end, the spacer 26 is placed between the lead 14 and the coil end (coil end which is not electrically connected) adjacent to the electrically-connected coil.

That is, in the present embodiment shown in FIG. 12, the connection ring 13 is connected to the coil end via the lead 14. The coil end which is not electrically connected to the lead 14 is mechanically connected to the lead 14 via the spacer 26.

Note that reference numeral 22 in FIG. 12 denotes a series connection which connects the top bar 3-1 and the bottom bar 3-2.

With this configuration of the present embodiment, similar advantages are obtained to those in the first embodiment. Further, the lead 14 connecting the connection ring 13 and the coil end is not only a route to output the electricity to the outside of the rotating electrical machine but mechanically suppresses the coil end from the connection ring 13 side, contributing to vibration reduction at the coil end. Accordingly, the enhancement of the mechanical connection between the lead 14 and the coil end, in addition to the enhancement of rigidity of the connection ring 13 with the dummy ring 23, provides the vibration reduction effect to the coil end.

Fourth Embodiment

Figure 13:
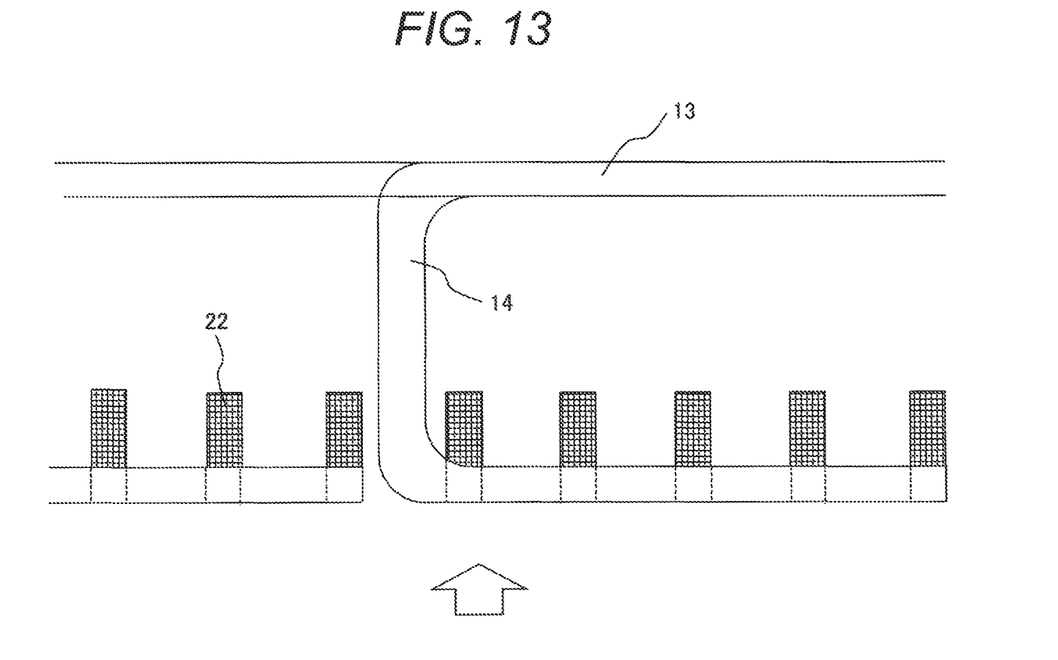
FIG. 13 is a diagram showing the lead viewed from the axial direction in the rotating electrical machine according to a fourth embodiment of the present invention.
Figure 14:
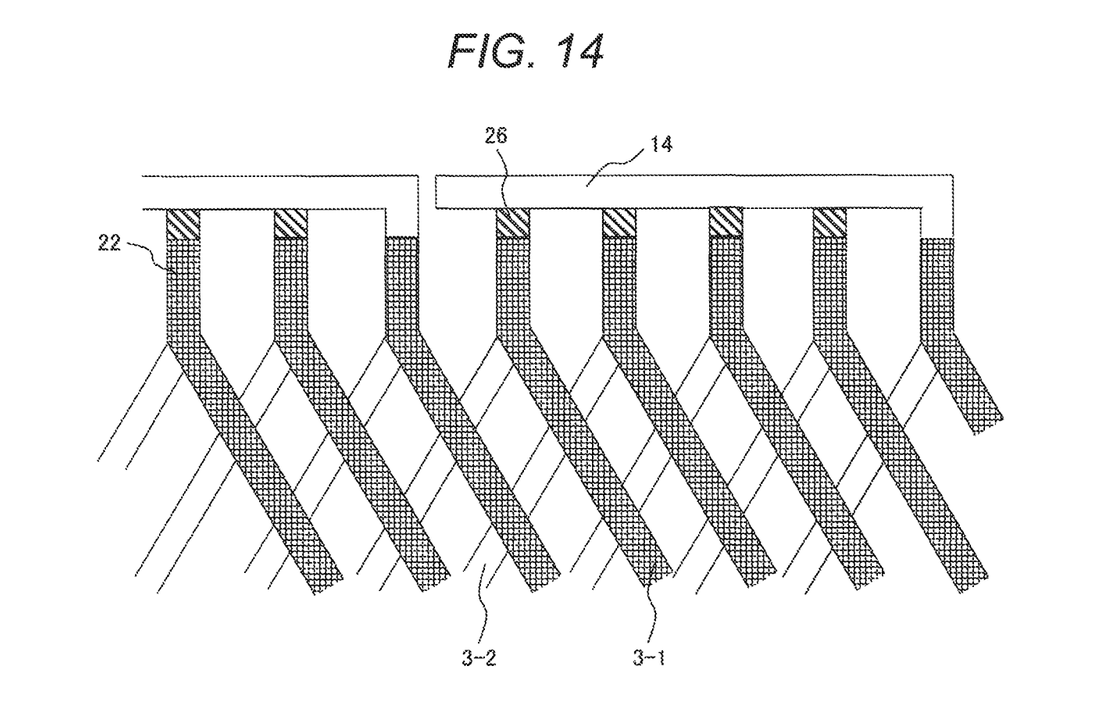
FIG. 14 is a diagram showing the lead viewed from the inner diameter side in the rotating electrical machine according to the fourth embodiment of the present invention.

With reference to FIGS. 13 and 14, a rotating electrical machine according to the fourth embodiment of the present invention will be described.

FIG. 13 shows the lead 14 in the rotating electrical machine according to the present embodiment viewed from the axial direction. FIG. 14 shows the lead 14 in the rotating electrical machine according to the present embodiment viewed from the inner diameter side. FIGS. 13 and 14 show a configuration evolved from the configuration of the third embodiment. In the configuration shown in FIGS. 13 and 14, the part of the lead 14 connecting to the coil end is extended, and the connection to the coil end is enhanced.

That is, in the present embodiment shown in FIG. 14, the connection ring 13 is connected via the lead 14 to the coil end, and plural coil ends which are not electrically connected to the lead 14 are mechanically connected to the lead 14 via the spacer 26.

With this configuration of the present embodiment, similar advantages are obtained to those in the first embodiment. Further, the lead 14 connecting the connection ring 13 and the coil end is not only a route to output the electricity to the outside of the rotating electrical machine but mechanically suppresses the coil end from the connection ring 13 side, contributing to vibration reduction at the coil end. Accordingly, the enhancement of the mechanical connection between the lead 14 and the coil end, in addition to the enhancement of rigidity of the connection ring 13 with the dummy ring 23, provides the vibration reduction effect to the coil end.

Note that the present invention is not limited to the foregoing embodiments, and the foregoing embodiments may be variously modified. The foregoing embodiments have been described in detail, for example, in order to facilitate the understanding of the present invention. The present invention is not limited to embodiments including all the above-described elements. Some elements of an embodiment may be replaced by the elements of another embodiment. Further, elements of an embodiment may be added to another embodiment. Furthermore, some elements of each embodiment may be deleted, subjected to the addition of other elements, or replaced by other elements.

LIST OF THE REFERENCE CHARACTERS

1 . . . rotor, 2 . . . stator core, 3 . . . stator coil (stator winding), 3-1 . . . top bar, 3-2 . . . bottom bar, 4 . . . stator, 5 . . . high voltage bushing, 6 . . . outer casing, 7 . . . terminal box, 8 . . . hydrogen cooler, 9 . . . end bracket, 10 . . . brush gear, 11 . . . foot, 12 . . . current transformer, 13 . . . connection ring, 14 . . . lead to stator bar, 15 . . . lead between connection ring to bushing, 16 . . . axial support, 17 . . . permanent ring, 18 . . . support ring, 19 . . . stator slot, 20 . . . stator core clamp, 22 . . . series connection, 23 . . . dummy ring, 23A . . . second dummy ring, 24 . . . bottom of connection ring, 25 . . . top of connection ring, 26 . . . spacer, 27 . . . dummy lead, 28 . . . vertical axis (vibration amplitude), 29 . . . horizontal axis (frequency), 30 . . . rotating frequency, 31 . . . frequency twice as the rotating frequency, 32 . . . natural frequency of coil end in traditional structure, 33 . . . natural frequency of coil end with dummy ring, 34 . . . vibration amplitude of coil end in traditional structure, 35 . . . vibration amplitude of coil end with dummy ring, 100 . . . rotating electrical machine.

What is claimed is:

1. A rotating electrical machine comprising:
a rotor;
a stator disposed facing the rotor with a predetermined gap, and including a stator core and a stator coil;
a high voltage bushing that outputs electricity from the stator coil to the outside;
an electric power line including at least a connection ring extending in a circumferential direction, and connecting the high voltage bushing and one side of a coil end which is an axial-direction end of the stator coil to form an electrical path; and a dummy ring including a metal as a main material, and disposed in alignment with the connection ring in the circumferential direction and in a same circumference as the connection ring.

2. The rotating electrical machine according to claim 1, wherein the connection ring and the dummy ring are supported with a plurality of axial supports that are radially fixed to an axial-direction end of the stator core at a predetermined interval in the circumferential direction.

3. The rotating electrical machine according to claim 1, wherein the dummy ring has same measurements, density, and rigidity as those of the connection ring, and is configured not to pass electric current through the dummy ring.

4. The rotating electrical machine according to claim 3, wherein the dummy ring is formed with one of a Cu-based member, a SUS-based member, and a combination member of a Cu-based or SUS-based material and FRP.

5. The rotating electrical machine according to claim 1, wherein the connection ring is connected to the coil end via a lead, and wherein the coil end not electrically connected to the lead is mechanically connected to the lead via a spacer.

6. The rotating electrical machine according to claim 1, wherein the connection ring is connected to the coil end via a lead, and wherein a plurality of the coil ends not electrically connected to the lead are mechanically connected to the lead via a spacer.

7. The rotating electrical machine according to claim 1, comprising:

a second dummy ring located over an entire circumference in the circumferential direction on the coil end side where the connection ring is not disposed.

8. The rotating electrical machine according to claim 7, wherein the second dummy ring is supported with a plurality of axial supports that are radially fixed to an axial-direction end of the stator core on the coil end side where the connection ring is not disposed at a predetermined interval in the circumferential direction.

9. The rotating electrical machine according to claim 7, wherein the second dummy ring is connected to the coil end via a dummy lead.

10. The rotating electrical machine according to claim 8, wherein the second dummy ring is connected to the coil end via a dummy lead.

* * * * *